US010642897B2

(12) United States Patent
Heidasch et al.

(10) Patent No.: US 10,642,897 B2
(45) Date of Patent: May 5, 2020

(54) DISTANCE IN CONTEXTUAL NETWORK GRAPH

(75) Inventors: Robert Heidasch, Speyer (DE); Stefan Scheidl, Dieburg (DE); Michael Neumann, Speyer (DE); Matthias Kaiser, Walldorf (DE); Stephan Brand, Wiesloch (DE); Nico Licht, Heidelberg (DE); Archim Heimann, Wiesloch (DE); Klaus Reichenberger, Frankfurt (DE); Steffen Moldaner, Riedstadt (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 1936 days.

(21) Appl. No.: 13/428,788

(22) Filed: Mar. 23, 2012

(65) Prior Publication Data

US 2013/0254193 A1 Sep. 26, 2013

(51) Int. Cl.
*G06F 16/901* (2019.01)
(52) U.S. Cl.
CPC .................. *G06F 16/9024* (2019.01)
(58) Field of Classification Search
CPC . G06F 17/30867; G06F 17/30; G06F 16/9024
USPC .... 707/736, 749, 758, 769, 797, 798; 705/7, 705/37
See application file for complete search history.

(56) References Cited

U.S. PATENT DOCUMENTS

| 5,331,554 | A  | * | 7/1994  | Graham  | G06F 17/30259 |
| 6,862,586 | B1 | * | 3/2005  | Kreulen | G06F 17/30014 |
| 2004/0024739 | A1 | * | 2/2004  | Copperman | G06F 17/30616 |
| 2007/0106651 | A1 | * | 5/2007  | Isaacson | G06K 9/627 |
| 2008/0013465 | A1 | * | 1/2008  | Yasukawa | H04L 12/1877 370/256 |
| 2008/0033785 | A1 | * | 2/2008  | Anke | G06F 9/5027 705/7.26 |
| 2009/0024385 | A1 | * | 1/2009  | Hirsch | G06F 17/2785 704/9 |
| 2009/0052374 | A1 | * | 2/2009  | Takeda | H04L 45/00 370/328 |
| 2009/0112655 | A1 | * | 4/2009  | Stuhec | G06Q 10/0633 705/7.27 |
| 2009/0313243 | A1 | * | 12/2009 | Buitelaar | G06F 17/30734 |
| 2010/0052872 | A1 | * | 3/2010  | Boss | G06Q 30/0613 700/295 |
| 2010/0082695 | A1 | * | 4/2010  | Hardt | G06F 17/30893 707/798 |
| 2010/0153090 | A1 | * | 6/2010  | Chen | G06F 17/2785 704/2 |
| 2010/0169415 | A1 | * | 7/2010  | Leggette | G06F 17/30233 709/203 |

(Continued)

*Primary Examiner* — Jorge A Casanova (74) *Attorney, Agent, or Firm* — Schwegman Lundberg & Woessner, P.A.

(57) ABSTRACT

A method and apparatus for determining relationships between objects in a meta-model semantic network is described. A contextual network graph comprising nodes and edges representing semantic objects and semantic relationships is generated from a meta-model of business objects from the meta-model semantic network. The contextual network graph is used to generate a unique identifier for each node and associated edge. The unique identifiers are used to compute information of cost and energy between the nodes. The information is stored in a meta-model semantic network database.

20 Claims, 7 Drawing Sheets

(56) References Cited

U.S. PATENT DOCUMENTS

| | | | |
|---|---|---|---|
| 2011/0106843 A1* | 5/2011 | Pan | G06F 17/30457 707/769 |
| 2011/0182482 A1* | 7/2011 | Winters | G06F 17/30256 382/116 |
| 2011/0258056 A1* | 10/2011 | Ioffe | G06Q 30/02 705/14.73 |
| 2012/0023263 A1* | 1/2012 | Dozier | G09B 19/22 709/248 |
| 2012/0124060 A1* | 5/2012 | Muskal | G06F 17/30958 707/748 |
| 2012/0317149 A1* | 12/2012 | Jagota | G06F 17/30958 707/798 |
| 2012/0320768 A1* | 12/2012 | Shaffer | H04W 40/16 370/252 |
| 2013/0212479 A1* | 8/2013 | Willis | G06Q 10/10 715/736 |

\* cited by examiner

| Source object key | Target object key | Distance chain key | Level | Distance cost | Energy |
|---|---|---|---|---|---|
| A | B | A-A1-A2-B | 3 | 12 | 12 |
| A | E1 | A-A1-A2-E1 | 3 | 12 | 10 |
| C | B | C-C1-C2-B | 3 | 21 | 21 |
| C | E1 | C-C1-C2-E1 | 3 | 16 | 16 |
| E | B | E-E1-A2-B | 3 | 12 | 12 |
| E | B | E-E1-C2-B | 3 | 21 | 21 |

DISTANCE IN CONTEXTUAL NETWORK GRAPH

FIELD

The present disclosure relates generally to data searches. In an example embodiment, the disclosure relates to searching enterprise data.

BACKGROUND

Generally, a search engine is a program that is designed to search for information from a variety of sources of data, such as the World Wide Web and File Transfer Protocol (FTP) servers. Many of these conventional search engines are designed to conduct searches based on matching of keywords. For example, a conventional search engine searches documents for keywords, which are specified by a user, and returns a list of documents where the keywords are found.

However, conventional search engines often do not take into account the semantic meaning of the keywords found in the enterprise data, such as, for example, business objects and business documents. To clarify this discussion, a "business object," as used herein, may refer to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity.

When searching, for example, business objects, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on the context of the attribute.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Some embodiments described herein provide a method and apparatus for determining relationships between objects in a meta-model semantic network. A contextual network graph comprising nodes and edges representing semantic objects and semantic relationships is generated from a meta-model of business objects from the meta-model semantic network. The contextual network graph is used to generate a unique identifier for each node and associated edge. The information is stored in a meta-model semantic network database.

Prior to discussing specific example embodiments, further descriptions of some terms are now provided for a better understanding of the descriptions set forth herein.

"Enterprise data," as used herein, may refer to data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such extensible markup language (XML)) or unstructured (e.g., word documents).

As used herein, a "semantic network" may refer to a network of semantic objects connected through semantic relations. A "semantic object," as used herein, may refer to a conceptual representation of a notion recognized by an enterprise, such as a product, person, employee, customer, business, document, case, project, business object, term, or any other suitable data. A "semantic relation," as used herein, may refer to a relationship between two or more semantic objects. Such relationships may have attributes and a type or definition that provides a conceptual meaning to how the two or more semantic objects are related to each other.

As used herein, a "meta-model semantic network" may refer to a semantic network generated based on a meta-model of the enterprise data. A "meta-model," as used herein, is a model that characterizes the conceptual meaning of elements of a business object definition. In turn, a "model" is a characterization of instances of an enterprise data. A definition of a business object is an example of a model. The definition may model an instance by defining the attributes (e.g., an address) associated with the business object. The meta-model then models these attributes and gives meaning to attributes (e.g., an address is a location).

"Semantic information," as used herein, may refer to information that provides conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

Figure 1:
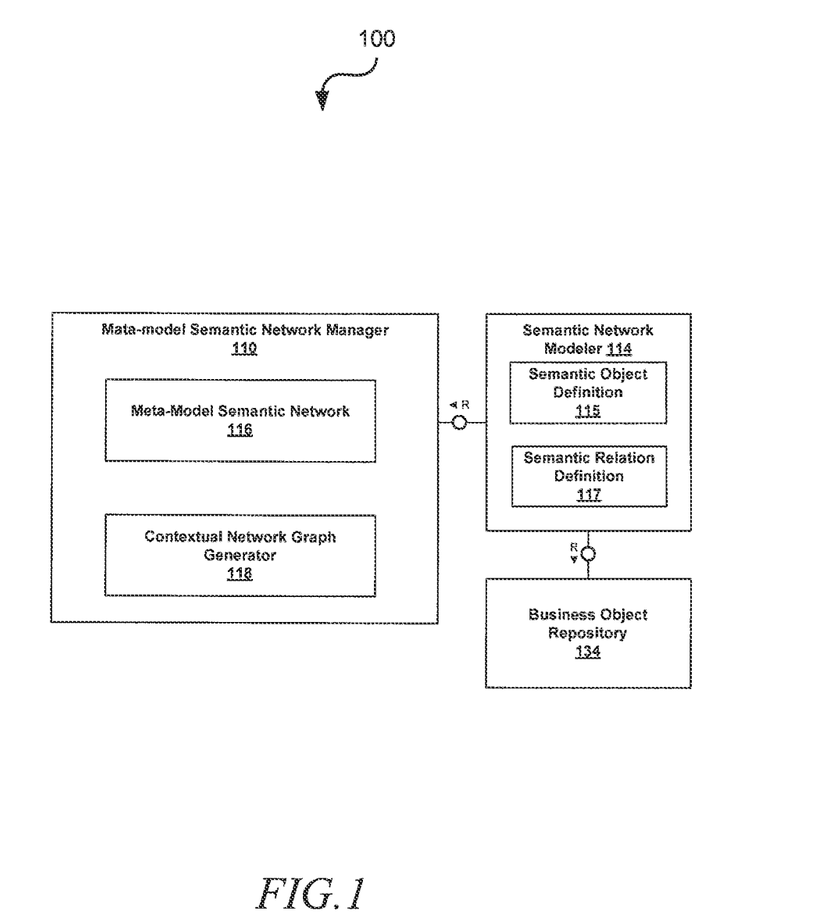
FIG. 1 is a block diagram depicting an architectural overview of a system for determining existing relationships between objects in a meta-model semantic network, in accordance with an example embodiment.

FIG. 1 is a block diagram depicting an architectural overview of a system for determining existing relationships between objects in a meta-model semantic network, in accordance with an example embodiment. The networked system 100 includes a meta-model semantic network manager 110 that is in communication with a semantic network modeler 114. The meta-model semantic network manager 110 and the semantic network modeler 114 may be embodied, individually or in combination, in a computing device in the form of, for example, a personal computer, a server computer, or any other suitable computing device. In various embodiments, the computing device may be used to implement computer programs, logic, applications, methods, processes, or software to determine existing relationships between objects in a meta-model semantic network using information, as described in more detail below.

The meta-model semantic network manager 110 is designed to maintain the meta-model semantic network 116. As described above, the meta-model semantic network 116 may be a semantic network that includes semantic objects and semantic relations that provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created or otherwise involving John Smith.

The meta-model semantic network manager 110 also includes a contextual network graph generator 118 that calculates information of cost and energy between nodes (described below). It also generates a unique identifier for each node and associated edge and stores the unique identifier and the information in a meta-model semantic network database.

As described above, the semantic objects and relations stored in the meta-model semantic network 116 may be based, in part, on semantic object definitions 115 and semantic relation definitions 117. Such semantic definitions may be based on a meta-model of the enterprise data. For example, the semantic network modeler 114 is a modeling tool that uses a meta-modeling based approach to generate a semantic object definition 115 and a semantic relation definition 117. The semantic object definition 115 and the semantic relation definition 117 may extend the definitions of enterprise data (e.g., business objects) at the meta-model level to provide semantic information. Such semantic information provides supplemental meaning to the elements, attributes, and relations between the business objects. As an example, the definition of an employee business object may be associated with an address. In some embodiments, such an address may be a field of the business object, and, in other embodiments, such an address may be represented by a separate business object. In this example, the semantic network modeler 114 may extend the definition of the employee definition, at the meta-model level, to give the address field the semantic meaning of location. That is, the association between the employee and the address characterizes the location of the particular employee.

In some embodiments, to assist an enterprise user in creating the semantic object definition 115 and the semantic relation definition 117, the semantic network modeler 114 may extract existing enterprise definitions stored in a business object repository 134. For example, a source of business object definitions in an SAP environment may be the SAP Enterprise Service Repository (ESR) or the SAP By-Design Model Repository. Once the business object definitions are extracted from the business object repository 134, the semantic network modeler 114 may be configured to provide, for example, a user interface to an enterprise user so that the enterprise user can model such definitions in a way that gives semantic meaning to the business objects.

The semantic network modeler 114 may be configured to send the semantic object definition 115 and the semantic relation definition 117 to the meta-model semantic network manager 110. In turn, the meta-model semantic network manager 110 may generate rule definitions, which are then sent to a text analyzer (not shown). The rule definition may contain the tokens and expressions with its types and metadata. For example, the rule definition may include data derived from the semantic network modeler 114. The text analyzer uses the rule definition to determine the terms used in documents and business objects upon receiving data. Analyzed data, in the form of objects and relations, are then sent to the meta-model semantic network manager 110 to be imported in the meta-model semantic network 116.

As described above, the meta-model semantic network 116 may store relations with enterprise data. In some embodiments, the meta-model semantic network manager 110 may receive the enterprise data through the text analyzer. The text analyzer is configured to extract enterprise data from enterprise data sources and export objects and relations to the meta-model semantic network manager 110. The text analyzer may extract enterprise data stored by enterprise systems, such as a business object stored by a business application and/or a document stored by a document storage system. The business application and the document storage system are examples of enterprise data sources. As is explained below, data derived from the business object and the document may be obtained through a crawler. Based on the rule definition, the text analyzer communicates objects and relations to the meta-model semantic network manager 110.

The business terminology and the business information may be integrated in the meta model-based semantic networked system 100, also referred to as contextual network graph.

Elements of the contextual network graph include semantic objects and semantic relations (i.e., relations between particular semantic objects) which allow defining semantically particular business objects, document, domains, terms, concepts, cases, notes, bookmarks, etc. (e.g., any kind of object that encapsulates some data and/or functionality). The semantic relation is an object defined by a respective meta model that defines the link type, its importance (i.e., source weight—authority, see below), direction (i.e., simple/bidirectional), etc. The semantic relations defines also the interesting for the semantic compound relations—relation chains that allows finding experts (e.g., who is working on particular topic, using particular terminology, etc) relevant documents (e.g. which documents are describing sale of particular material, etc.), business partners (e.g. which supplier offers a required material that fulfils conditions, etc.). One aspect of the present embodiment is scalability and performance of the contextual network graph.

With respect to FIG. 1, it should be appreciated that in other embodiments, the system 100 may include fewer or more components apart from those shown in FIG. 1. For example, in an alternate embodiment, the semantic network modeler 114 can be integrated within the meta-model semantic network manager 110. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 2:
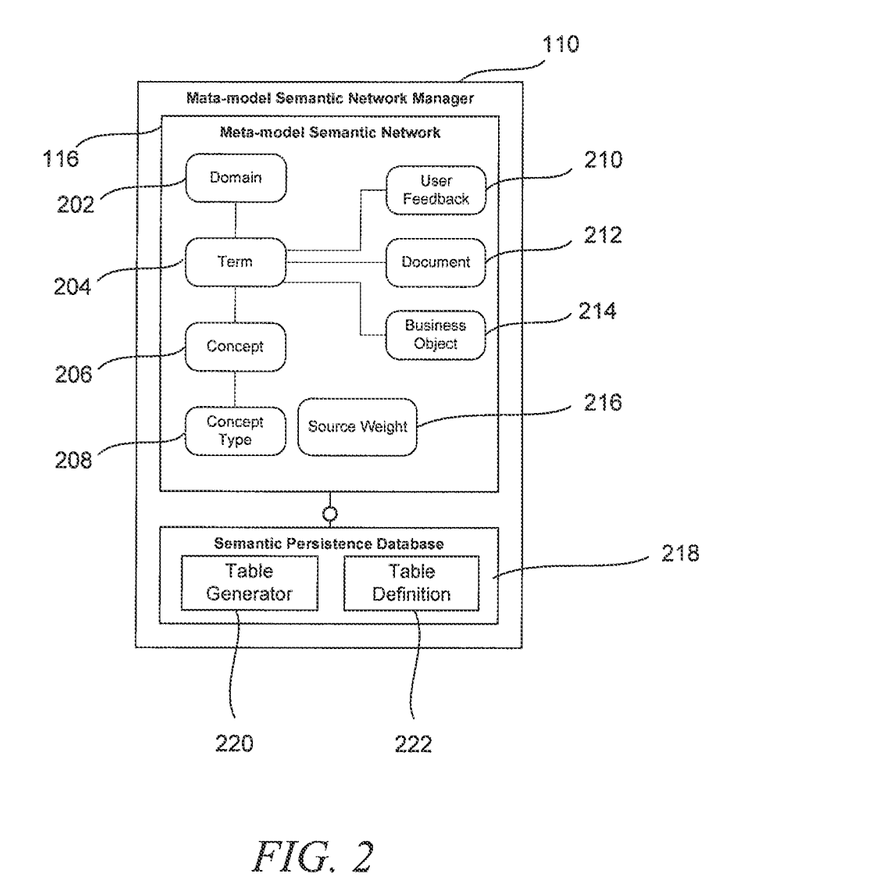
FIG. 2 is a block diagram showing a meta-model semantic network manager, in accordance with an example embodiment.

FIG. 2 is a block diagram showing a meta-model semantic network manager, in accordance with an example embodiment. The meta-model semantic network 116 includes nodes that link a term 204 to a domain 202 and a concept 206. In turn, the concept 206 may be linked to a concept type 208. Although FIG. 2 shows the nodes of the semantic network 116 as single entities, it is to be appreciated that meta-model semantic network 116 may include fewer or more nodes apart from those shown in FIG. 2. For example, a concept may be linked to one or more terms. Still further, additional and different nodes may be utilized by the meta-model semantic network 116.

The term 204 may be a word or phrase found in a business application, a document, the Internet or Web, or manually created by an end-user. The concept 206 may refer to a unit of meaning to which the term 204 refers to, such as a specific idea or notion. The concept 206 groups all the terms that are used to express this idea as synonyms. For example, a product may be associated with multiple product names. Accordingly, each of the product names may be stored as separate terms in the meta-model semantic network 116, all linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The meta-model semantic network 116 may also include nodes that relate the term 204 to enterprise data, such as a user feedback object 210, document 212, and business object 214. A user feedback object 210 may be any data embedded into enterprise data to provide further contextual data to the enterprise data. Notes, bookmarks, annotations, or any other user-embedded data are examples of user feedback objects.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object 214 that includes the relevant relations and attributes.

The semantic persistence database 218 may store different meta-model semantic networks 116. For example, a first meta-model semantic network may include semantic relations and semantic objects optimized to respond to queries directed to sales orders (e.g., who created a sales order, what suppliers provide a certain part, etc), while another meta-model semantic network may include semantic relations and semantic objects optimized to respond to queries related to finding experts in a domain.

In one embodiment, the semantic persistence database 218 may include a memory-based database comprising a table generator 220 and a table definition 222. The contextual network graph may use a unique identification of particular nodes and relations/edges. Each relation may contain information about relation/edges cost (e.g., how the near the objects are located in network graph), and energy (e.g., how often the relation is used).

Because in practice the business-relevant relations between business objects, documents and business terminology (e.g., terms, concepts and knowledge domains) are not infinite, the pre-calculation of the node relations (relation chain) can be reduced to the particular level which has significant influence on the solution performance.

The table generator 220 may generate information from a contextual network graph node with a collection of relation/edge entries that contain the following information:

Source network ID: key of metamodel semantic network where the source object is placed.

Target network ID: key of metamodel semantic network where the end/target object is placed. This information allows handling of parallel networks that may be connected by "shared elements" (elements that are defined in more networks and build a bridge between networks).

Source object key: key of object where the begin/source object is placed.

Target object key: key of object which is the end/target of particular relation chain.

Distance chain key: cumulated string representing the relation chain.

Level—relation/chain level: length of the relation chain.

Distance cost

Distance energy

The table definition 222 may include the source object key, source network ID, target object key, target network ID, distance chain key, the relation/chain level, the distance cost, and the distance energy. In addition, the table definition 222 may include respective updates for parallel networks. Such configured relation/edge entries allow the determining of chains with double level number of relations/edges. For example, if the level is set to 3, then the number of relations/edges included in the determined chain is 6 (i.e., maximum level number).

Each object is identified by a unique identifier (so-called object UUID) and supported with a memory-based database.

This is because the identifier could be, for example, a 64 bit unique identifier, which fits to the memory model of a memory-based database. Therefore, the present embodiment allows compression in memory of huge data amounts and allows for fast operations. In this case, each object/node and relation/edge may be located in a particular memory area of the memory addresses that can be used in the pointing/assignment mechanism and additionally reused for the hash value determination.

Figure 3:
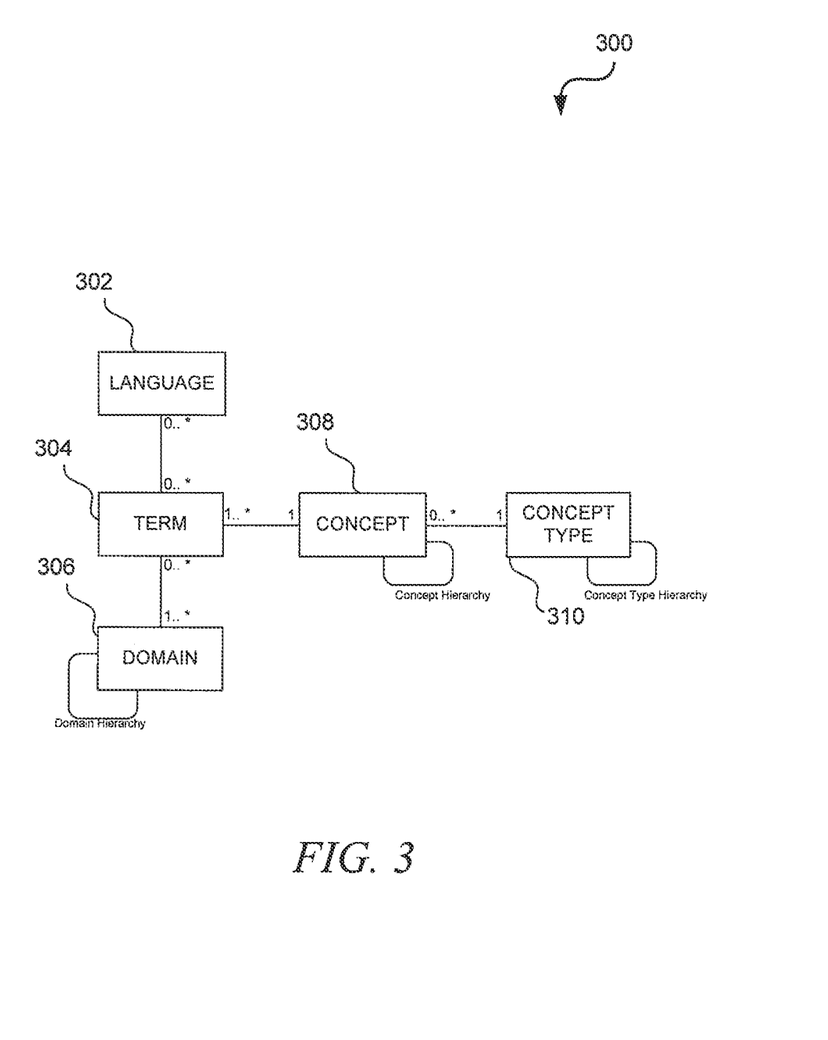
FIG. 3 is a block diagram illustrating terminology of a meta-model semantic network, in accordance with an example embodiment.

As FIG. 3 shows, the semantic network 300 links a term 304 to a language 302, one or more domains 306, and a concept 308. In turn, the concept 308 may be linked to a concept type 310. The links between the various components of the semantic network 300 may define the cardinality of the relationship between the components. For example, the link from the concept 308 to the concept type 310 shows a cardinality of "1," which is to be interpreted as an association with one and only one. Thus, the concept 308 may be linked to one and only one concept type 310. As another example, at the term end of the Term-Language link, the link shows a cardinality of "0 . . . *." The symbol "*" is to be interpreted as any number. Thus, a language may be linked to zero or many terms.

The term 304 may be a word or phrase found in a business application, a document, the Internet or Web, or manually created by an end-user. The concept 308 may refer to a unit of meaning to which the term 304 refers, such as a specific idea or notion. The concept 308 groups all the terms that are used to express the specific idea as synonyms. For example, the terms "COLGATE," COLGATE-PALMOLIVE," "C-P," and "CP" may refer to the concept of the company Colgate-Palmolive. Accordingly, "COLGATE," "COLGATE-PALMOLIVE," "C-P," and "CP" are all synonyms for the Colgate-Palmolive company concept.

The domain 306 may define the knowledge domain or a particular field of knowledge. The domain 306 may group terms used within a particular context, in some cases, the concept 308 related to the term 304 may depend on the domain. For example, the meaning of the term Colgate may differ depending on whether the term 304 is used in the domain 306 of toothpaste rather than in the domain 306 of colleges. As FIG. 3 shows, the domain 306 may be associated with a hierarchy of domains.

The language 302 may distinguish the language that the term 304 is used in. For example, the concept 308 a term 304 relates to may depend on the language associated with the term 304. For example, the term "SOY" associated with the language "SPANISH" will be distinguished from the term "SOY" associated with the language "ENGLISH."

The concept type 310 may be metadata that characterizes the attributes associated with the concept 308. The concept type 310 may, for example, describe the attributes associated with the concept "COMPANY," or any other suitable concept 308.

Figure 4:
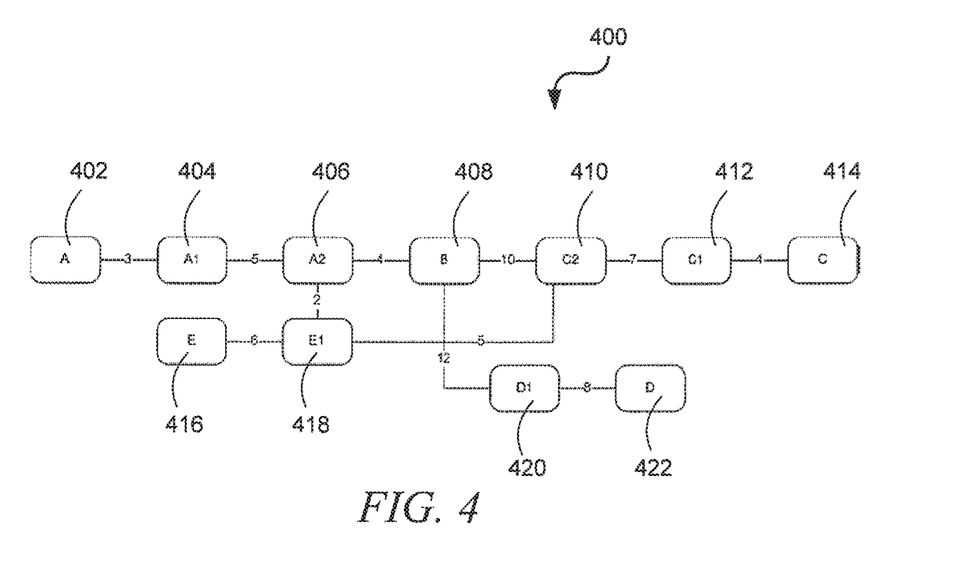
FIG. 4 is a block diagram illustrating examples of nodes and their relations, in accordance with an example embodiment, in a contextual network graph.

FIG. 4 is a block diagram illustrating examples of nodes and their relations, in accordance with an example embodiment, in a contextual network graph 400. For example, the contextual network graph 400 includes node A 402, node A1 404, node A2 406, node B 408, node C2 410, node C1 412, node C 414, node E 416, node E1 418, node D1 420, and node D 422.

The energy cost is illustrated between each node. For example, the energy cost between node A 402 and node A1 404 is 3 units. The energy cost between node A1 404 and node A2 406 is 5 units.

Figure 5:
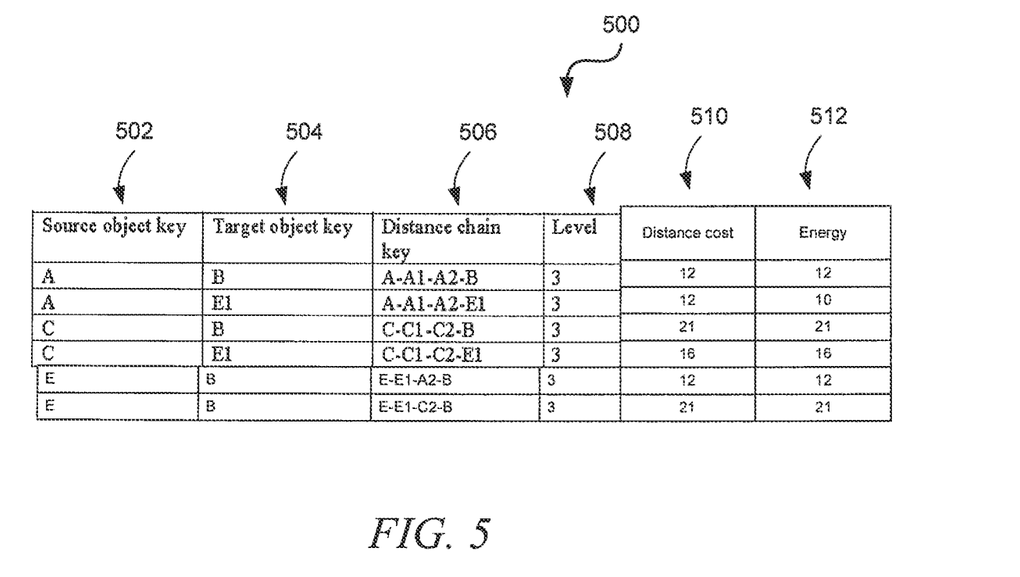
FIG. 5 is table illustrating examples of distance cost and energy cost, in accordance with an example embodiment.

FIG. 5 is table 500 illustrating examples of distance cost and energy cost, in accordance with an example embodiment. It should be noted that the table 500 is only an excerpt from a whole table. In other words, the table 500 contains only exemplary entries which depict the possible relations for A and C elements as source objects and for third-level relation chains. The example in table 500 is to illustrate the fact that this representation allows finding of "longer" relation chains—one may navigate from A to C using the B or E1 nodes as "common" target nodes.

In other embodiments, the table contains a "full" list of relation chains from 1 to X, where the X is the configured number of chain level. The usage of parallel networks may be enabled by adding the following two elements to the table: Source network ID—key of metamodel semantic network where the source object is placed, and Target network ID—key of metamodel semantic network where the end/target object is placed—"shared elements".

The table 500 includes entries for a source object key 502, a target object key 504, a distance chain key 506, a level 508, and a distance cost 510. As previously described, the source object key 502 includes a key of objects where the collection is placed. The target object key 504 includes a key of objects which are the end/target of a particular relation chain. The distance chain key 506 includes the cumulated string representing the relation chain. The level 508 includes relation/chain level (e.g., the length of the relation chain). The distance cost 510 and energy 512 respectively include the cost and energy from one node to another.

With respect to FIGS. 4 and 5, the node E 416 is linked to node B 408 via node E1 418 and node A2 406 or via node E1 418 and node C2 410. In both cases, the cost/energy are different. The cost and/or energy is 12 via nodes E1 418 and A2 406. The cost and/or energy is 21 via nodes E1 418 and C2 410.

If the distance of relations/edges between node A 402 and C 414 is to be determined, the common node is identified (node B 408 or node E1 418). In this case, the distance can be calculated or determined as a minimum level and/or a distance cost/energy where the source object key (node) is node A 402 or node C 414 and the target object key (node) is the same for node A 402 and node C 414—in this case the node B 408 and node E1 418.

The minimum cost from node A 402 to node C 414 would be the A to C chain via node E1 and the distance cost/energy would be 26 (sum of A→E1→10 and C→E1→16).

This kind of query is supported by memory-based database resulting in the required result—the optimal relation between A and C with minimum level and distance cost/energy using one query call (i.e., optimal performance for distance determination call).

This model allows also the building of queries that may deliver answers to questions using the strong linking and reusing features. The present embodiment supports weighted and un-weighted relations (e.g., edges) in a contextual network graph which may represent the cost of connection. Additionally, the relation may be directional and unidirectional. This gives four combinations of relations: directed weighted edges, directed un-weighted edges, undirected weighted edges, undirected un-weighted edges.

Because the creation of the collection of relation/edge entries may take time, the creation of the entries between nodes (e.g., those containing unique identifiers of particular business object, document, used terms, responsible persons, permissions, etc.) is performed offline, e.g., as a background process. As such, a subsequent request from an end-user can be processed very fast.

If the business application (e.g., SAP business applications—ERP, CRM, SCM, etc.) and its business objects are the source of the domain-oriented knowledge, the semantic network may present their relation, e.g., a similar product, customers, etc. This is the case if respective information are imported/transferred from the business application to such defined contextual network graph.

In one embodiment, the initial value of the preconfigured level and the system administrator may adapt to the local installation requirements (e.g., used business applications and complexity, etc.).

In another embodiment, if many calls are missing because of incorrect configuration of level (e.g., current configured level is 2 but many queries can be resolved without using full network search if the level is 3) the system automatically detects such problems (e.g., cost analysis of the missing queries) and may signal the problem to the system administrator or even adapt itself automatically to the optimal level (less cost of current calls).

In another embodiment, the fast navigation to elements/nodes is supported by the usage of note references—an additional information/column near the source and target object key that helps by using memory addresses (e.g., reference/pointers) in the memory database (e.g., the search objects/nodes are placed in the same memory area). Any movement of the notes in memory requires recalculation of the references and therefore the system may calculate the benefit and cost of such configuration and adapt the configuration to the local installation.

Figure 6:
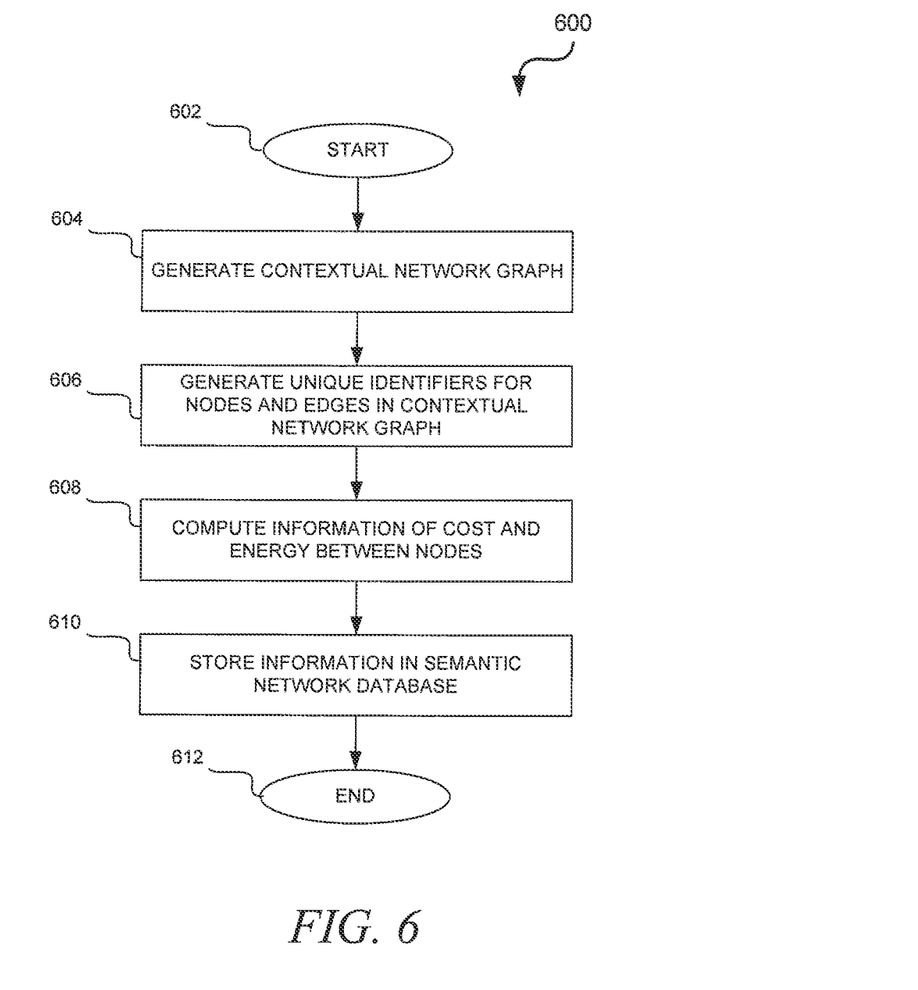
FIG. 6 depicts a flow diagram of a general overview of a method for determining existing relationships between objects in a meta-model semantic network, in accordance with an embodiment.

FIG. 6 depicts a flow diagram of a general overview of a method 600 for determining existing relationships between objects in a meta-model semantic network, in accordance with an embodiment.

In an example embodiment, the method 600 may be implemented by the meta-model semantic network manager 110 included in the system 100 of FIG. 1.

Referring to FIG. 6, the method 600 for determining relationships between objects in a meta-model semantic network may begin at operation 602. Then, at operation 604, the meta-model semantic network manager 110 generates a contextual network graph comprising nodes and edges representing semantic objects and semantic relationships extracted from a meta-model of business objects from the meta-model semantic network.

At operation 606, the meta-model semantic network manager 110 uses the contextual network graph to generate a unique identifier for each node and associated edge of the meta-model semantic network. For example, the semantic objects comprise business objects, documents, and business terminology.

At operation 608, the unique identifiers are used to compute information of cost and energy between the nodes. For example, the cost identifies a distance between semantic objects located in the contextual network graph. For example, the energy identifies how often a relationship between the nodes is used.

In one embodiment, the contextual network graph comprises a table having a source object key data, a target object key data, a distance chain key data, a level data, a distance cost data, and a distance energy data.

In one embodiment, the source object key includes a key of the object where the collection is placed. The target object key includes a key of object which is the end/target of a particular relation chain. The distance chain key includes a cumulated string representing the relation chain. The level data identifies the length of a relation chain between nodes.

In another embodiment, the cost and energy between all nodes in the contextual network graph is pre-calculated prior to receiving a request to determine a cost and energy between a first and a second node within a predefined relationship level.

At operation 610, the information is stored in a meta-model semantic network database. In one embodiment, the information is stored in a memory-based database. The method 600 then ends at operation 612.

Figure 7:
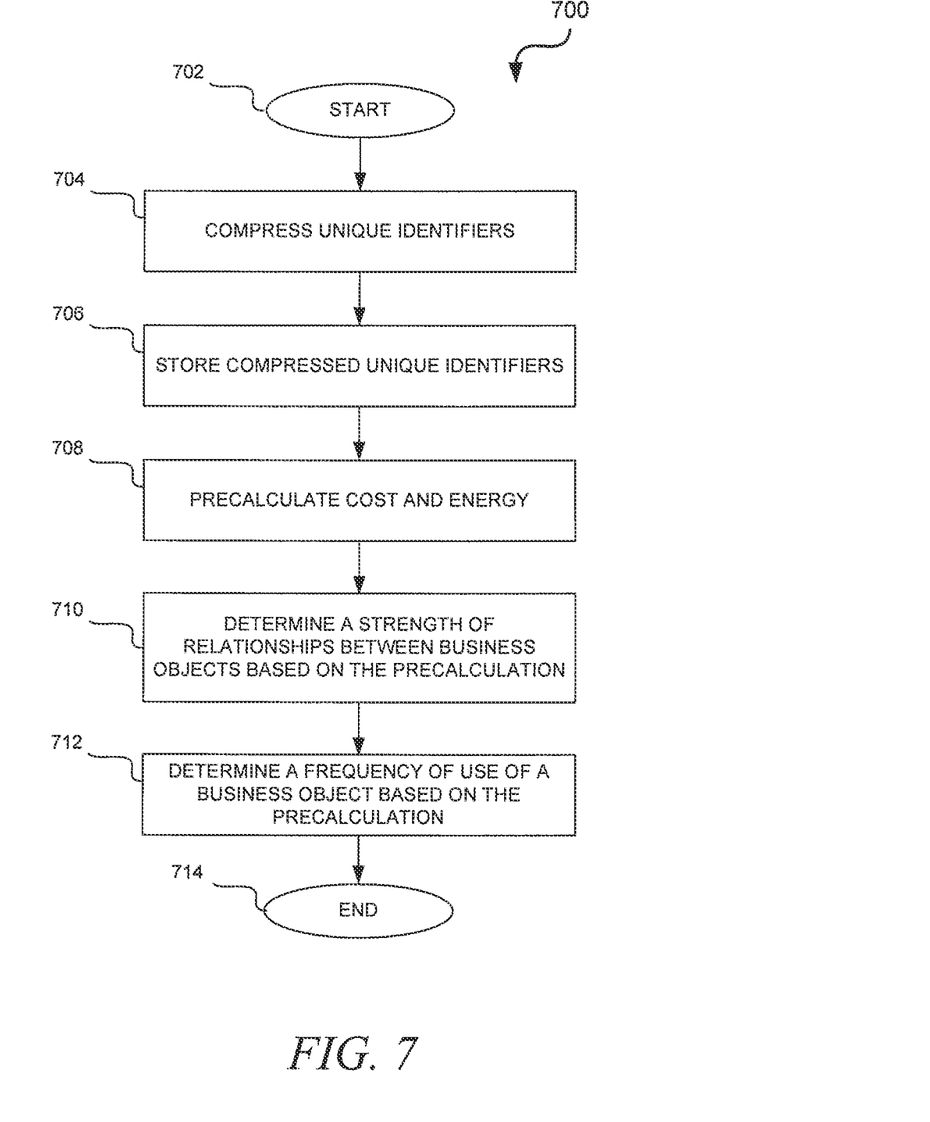
FIG. 7 depicts a flow diagram of a general overview of a method for determining existing relationships between objects in a meta-model semantic network, in accordance with another embodiment.

FIG. 7 depicts a flow diagram of a general overview of a method 700 for determining existing relationships between objects in a meta-model semantic network, in accordance with another embodiment.

In an example embodiment, the method 700 may be implemented by the meta-model semantic network manager 110 included in the system 100 of FIG. 1.

Referring to FIG. 7, the method 700 for determining relationships between objects in a meta-model semantic network may begin at operation 702. Then, at operation 704, the meta-model semantic network manager 110 compresses unique identifiers of nodes and edges representing semantic objects and semantic relationships extracted from a meta-model of business objects from the meta-model semantic network.

At operation 706, the compressed unique identifiers are stored in a memory-based database.

At operation 708, the meta-model semantic network is used to pre-calculate the cost and energy between the nodes in the contextual network graph prior to receiving a request to determine a cost and energy between a first and a second node within a predefined relationship level. In another embodiment, the compressed unique identifiers are used to pre-calculate the cost and energy between the nodes. The cost and energy values are subsequently updated in the running system. For example, if the user very often uses a particular relation then the energy may increase. If the experts determine that the business relations are closer, they may choose to reduce/adapt the cost.

At operation 710, strength of the relationships between business objects is determined based on the computed cost and energy of the nodes and edges from the contextual network graph.

At operation 712, a frequency of use of a business object is determined based on the computed cost and energy between the nodes of the contextual network graph.

Figure 8:
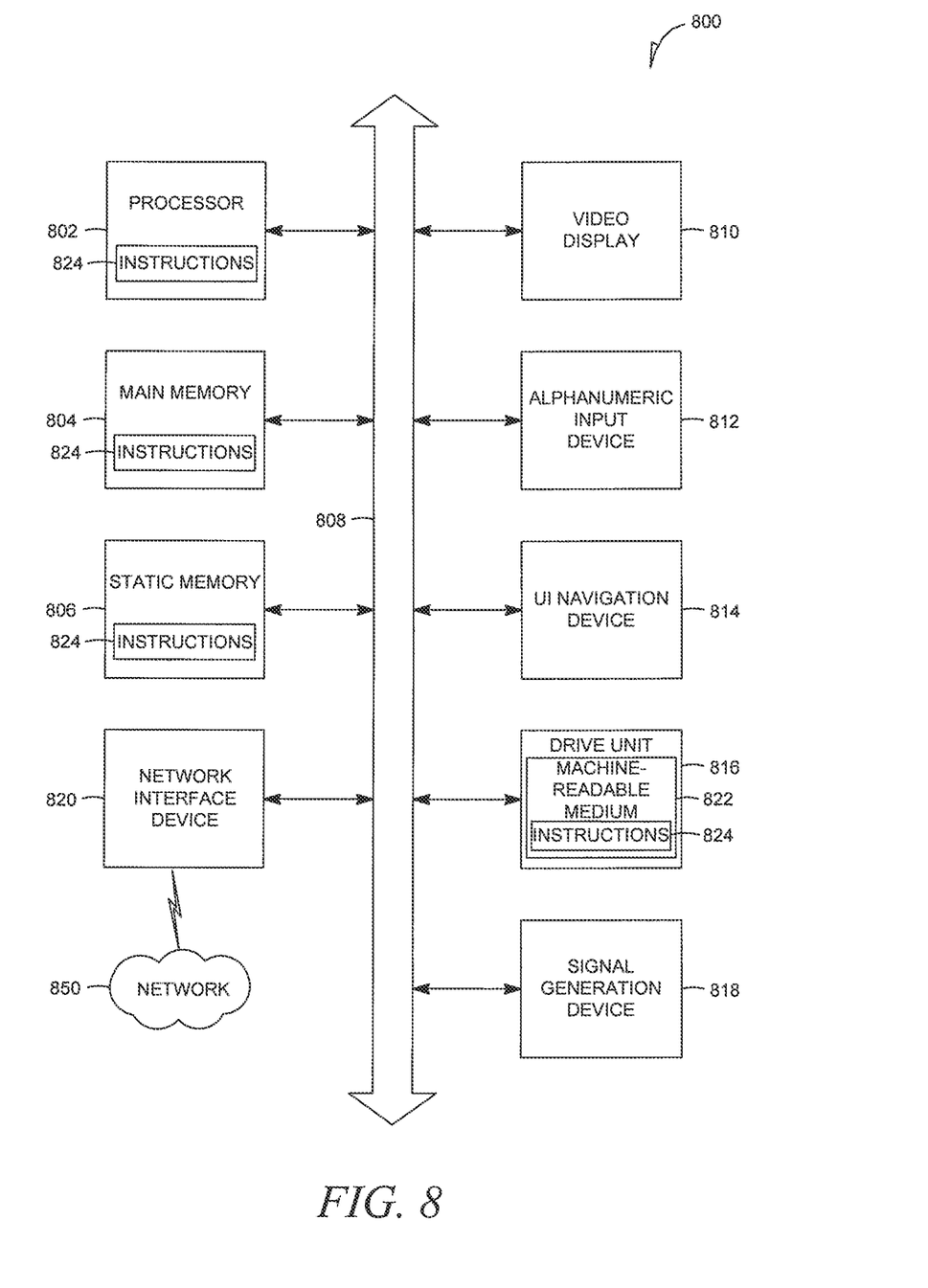
FIG. 8 is a block diagram depicting a machine in the example form of a computing device within which may be executed a set of instructions for causing the machine to perform any one or more of the methodologies discussed herein.

FIG. 8 depicts a block diagram of a machine in the example form of a computing device 800 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 800 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 800 may further include video display unit 810 (e.g., a plasma display, a liquid crystal display (LCD) or a cathode ray tube (CRT)), The computing device 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 800, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 800) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

Again, the proposed embodiment uses a model of uniquely identified nodes which contains the pre-calculated relations to nodes in a defined relation level. The most time-consuming operation is performed directly before the contextual network graph is updated (i.e., before it is visible for the end-user); therefore the "reading" relation determination is very fast because the operation requires one select statement in the new memory-based databases (e.g. SAP HANA) that allows optimization/pre-compilation of conditional select statements.

Additionally, the uniqueness of nodes and relations allows the usage of hash values for particular elements/pieces which supports the calculation correlation chains. The uniqueness is strongly supported in the SAP HANA solution which allows compression in memory of huge data amounts and very fast operations.

This model may quickly deliver the shortest, cheapest or most used (see energy calculation) relations between two nodes (e.g., business objects, documents, used terminology, etc.). If the business application (e.g. SAP business applications—ERP, CRM, SCM, etc.) and its business objects are the source of domain-oriented knowledge, the contextual network graph may clearly present their relation, e.g., similar product, customers, etc, (if respective information is imported/transferred from the business application to the contextual network graph).

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method for responding to a query to an enterprise data source based on relationships between objects in a meta-model semantic network, the method comprising:
    generating a contextual network graph comprising nodes and edges representing semantic objects and semantic relationships extracted from a meta-model of business objects from the meta-model semantic network;
    using the contextual network graph to generate a unique identifier for each node and associated edge;
    receiving a request to determine a cost and energy between a first and a second node within a predefined relationship level;
    using at least one processor, calculating a cost between two or more nodes in the contextual network graph prior to receiving the request;
    using the at least one processor, calculating an energy between the two or more nodes, wherein the energy describes how often a relationship between the two or more nodes is used;
    storing the cost, the energy, and the unique identifiers in a meta-model semantic network database;
    receiving a query indicating a first business object described by the meta-model of business objects and a relationship to the first business object; and
    using the meta-model semantic network to identify a second business object having the relationship to the first business object.

2. The method of claim 1, wherein the cost identifies a distance between semantic objects located in the contextual network graph.

3. The method of claim 1, wherein the meta-model of business objects includes a model that characterizes a conceptual meaning of elements of a definition of business objects, the model characterizing instances of enterprise data, the definition of business objects modeling an instance by defining attributes associated with the business object, the meta-model modeling the attributes and giving meaning to the attributes.

4. The method of claim 1, wherein the semantic objects comprise business objects, documents, and business terminology.

5. The method of claim 1, wherein the contextual network graph comprises a table having source object key data, target object key data, distance chain key data, level data, distance cost data, and distance energy data.

6. The method of claim 5, wherein the level data identifies a length of a relation chain between nodes.

7. The method of claim 1, further comprising:
    using the calculated cost and energy between the nodes of the contextual network graph to determine a frequency of use of a business object.

8. The method of claim 1, further comprising:
    using the calculated cost and energy of the nodes and edges from the contextual network graph to determine a strength of a relationship between business objects.

9. The method of claim 1, further comprising:
    compressing the unique identifiers;
    storing the compressed unique identifiers in a memory-based database; and
    using the compressed unique identifiers to perform the calculation.

10. An apparatus for responding to a query to an enterprise data source based on relationships between objects in a meta-model semantic network, the apparatus comprising:
    a meta-model semantic network stored in a memory, the meta-model semantic network comprising nodes and edges representing semantic objects and semantic relationships extracted from a meta-model of business objects from the meta-model semantic network; and
    a processor-based contextual network graph generator coupled to the meta-model semantic network, the contextual network graph generator configured to perform operations comprising:
    receiving a request to determine a cost and energy between a first and a second node within a predefined relationship level;
    calculating the cost between two or more nodes in the contextual network graph prior to receiving the request;
    calculating an energy between the two or more nodes in the contextual network prior to receiving the request, wherein the energy describes how often a relationship between the two or more nodes is used;
    using at least one hardware device, generating a unique identifier for each node and associated edge,
    storing the cost, the energy, and the unique identifier in a meta-model semantic network database;
    receiving a query indicating a first business object described by the meta-model of business objects and a relationship to the first business object; and
    using the meta-model semantic network to identify a second business object having the relationship to the first business object.

11. The apparatus of claim 10, wherein the cost identifies a distance between semantic objects located in the contextual network graph.

12. The apparatus of claim 10, wherein the energy identifies how often a relationship between the nodes is used, and wherein the semantic objects comprise business objects, documents, and business terminology.

13. The apparatus of claim 10, wherein the processor-based contextual network graph comprises a table having source object key data, target object key data, distance chain key data, level data, distance cost data, and distance energy data, wherein the level data identifies a length of a relation chain between nodes.

14. The apparatus of claim 10, wherein the processor-based contextual network graph generator is configured to use the calculated cost and energy between the nodes of the contextual network graph to determine a frequency of use of a business object.

15. The apparatus of claim 10, wherein the processor-based contextual network graph generator is configured to use the calculated cost and energy of the nodes and edges from the contextual network graph to determine a strength of a relationship between business objects.

16. The apparatus of claim 10, wherein the processor-based contextual network graph generator is further configured to:
 compress the unique identifiers;
 store the compressed unique identifiers in a memory-based database; and
 use the compressed unique identifiers to perform the calculation.

17. A non-transitory, computer-readable medium that stores instructions, which, when performed by a computer, cause the computer to perform operations comprising:
 generating a contextual network graph comprising nodes and edges representing semantic objects and semantic relationships extracted from a meta-model of business objects from a meta-model semantic network;
 using the contextual network graph to generate a unique identifier for each node and associated edge;
 receiving a request to determine a cost and energy between a first and a second node within a predefined relationship level;
 calculating the cost between two or more nodes in the contextual network graph prior to receiving the request;
 calculating an energy between the two or more nodes, wherein the energy describes how often a relationship between the two or more nodes is used;
 storing the cost, the energy, and the unique identifiers in a meta-model semantic network database;
 receiving a query indicating a first business object described by the meta-model of business objects and a relationship to the first business object; and
 using the meta-model semantic network to identify a second business object having the relationship to the first business object.

18. The computer-readable medium of claim 17, wherein the cost identifies a distance between semantic objects located in the contextual network graph.

19. The computer-readable medium of claim 17, wherein the meta-model of business objects includes a model that characterizes a conceptual meaning of elements of a definition of business objects, the model characterizing instances of enterprise data, the definition of business objects modeling an instance by defining attributes associated with the business object, the meta-model modeling the attributes and giving meaning to the attributes.

20. The computer-readable medium of claim 17, wherein the semantic objects comprise business objects, documents, and business terminology.

\* \* \* \* \*